(12) United States Patent
Halbritter et al.

(10) Patent No.: US 7,801,736 B1
(45) Date of Patent: Sep. 21, 2010

(54) SYSTEM, METHOD, AND ARTICLE OF MANUFACTURE FOR LOCATING AND COMMUNICATING WITH A PATRON AT A HOSPITALITY FACILITY

(75) Inventors: Arthur R. Halbritter, Rome, NY (US); Frank J. Riolo, Rome, NY (US); James R. Lavoie, Voluntown, CT (US); John A. Santini, Jr., Wakefield, RI (US); Robert C. Angell, West Greenwich, RI (US)

(73) Assignee: WMS Gaming, Inc., Waukegan, IL (US)

( * ) Notice: Subject to any disclaimer, the term of this patent is extended or adjusted under 35 U.S.C. 154(b) by 3679 days.

(21) Appl. No.: 09/689,842

(22) Filed: Oct. 13, 2000

(51) Int. Cl.
*G06Q 10/00* (2006.01)
*G06Q 30/00* (2006.01)

(52) U.S. Cl. .............................. 705/1; 705/7; 342/465; 342/386; 342/454; 342/357.09; 701/207; 370/346

(58) Field of Classification Search ...................... 705/1, 705/7; 342/465, 386; 701/207; 370/346
See application file for complete search history.

(56) References Cited

U.S. PATENT DOCUMENTS

| | | |
|---|---|---|
| 4,240,635 A | 12/1980 | Brown |
| 4,283,709 A | 8/1981 | Lucero et al. |
| 4,335,809 A | 6/1982 | Wain |
| 4,339,798 A | 7/1982 | Hedges et al. |
| 4,359,631 A | 11/1982 | Lockwood et al. |
| 4,467,424 A | 8/1984 | Hedges et al. |
| 4,494,197 A | 1/1985 | Troy et al. |
| 4,575,622 A | 3/1986 | Pellegrini |
| 4,636,951 A | 1/1987 | Harlick |
| 4,648,600 A | 3/1987 | Olliges |
| 4,669,730 A | 6/1987 | Small |
| 4,760,527 A | 7/1988 | Sidley |

(Continued)

FOREIGN PATENT DOCUMENTS

EP 0769769 A1 4/1997

(Continued)

OTHER PUBLICATIONS

Pot-O-Gold, 19" Touchscreen Multi-Game Terminal Toucheasy Keno Play Description.

(Continued)

*Primary Examiner*—Gerald J. O'Connor
*Assistant Examiner*—Linh Michelle Le
(74) *Attorney, Agent, or Firm*—DeLizio Gilliam, PLLC

(57) ABSTRACT

A system, method, and article of manufacture for locating or communicating with a patron at a hospitality facility includes a server and a plurality of client terminals. The server may receive, from one of the plurality of client terminals, a patron identifier identifying a patron and a location identifier identifying a location in the hospitality facility and storing the location identifier in an account corresponding to the patron identified by the patron identifier. A patron, using a client terminal may send a request for the location of a particular patron to the server. The server retrieves, from an account corresponding to the particular patron, a location identifier for the particular patron and sends a message based on the location identifier for the particular patron.

44 Claims, 10 Drawing Sheets

U.S. PATENT DOCUMENTS

| | | |
|---|---|---|
| 4,815,741 A | 3/1989 | Small |
| 4,856,787 A | 8/1989 | Itkis |
| 4,880,237 A | 11/1989 | Kishishita |
| 4,882,473 A | 11/1989 | Bergeron et al. |
| 4,926,327 A | 5/1990 | Sidley |
| 4,994,908 A | 2/1991 | Kuban et al. |
| 5,038,022 A | 8/1991 | Lucero |
| 5,119,295 A | 6/1992 | Kapur |
| 5,159,549 A | 10/1992 | Hallman, Jr. et al. |
| 5,179,517 A | 1/1993 | Sabin et al. |
| 5,197,094 A | 3/1993 | Tillery et al. |
| 5,223,698 A | 6/1993 | Kapur |
| 5,259,613 A | 11/1993 | Marnell, II |
| 5,265,874 A | 11/1993 | Dickinson et al. |
| 5,287,269 A | 2/1994 | Dorrough et al. |
| 5,297,802 A | 3/1994 | Pocock et al. |
| 5,324,035 A | 6/1994 | Morris et al. |
| 5,326,104 A | 7/1994 | Pease et al. |
| 5,332,076 A | 7/1994 | Ziegert |
| 5,371,345 A | 12/1994 | LeStrange et al. |
| 5,408,417 A | 4/1995 | Wilder |
| 5,429,361 A | 7/1995 | Raven et al. |
| 5,506,587 A * | 4/1996 | Lans .................... 342/357.09 |
| 5,581,461 A | 12/1996 | Coll et al. |
| 5,613,912 A | 3/1997 | Slater |
| 5,655,961 A | 8/1997 | Acres et al. |
| 5,674,128 A | 10/1997 | Holch et al. |
| 5,722,890 A | 3/1998 | Libby et al. |
| 5,732,398 A | 3/1998 | Tagawa |
| 5,755,621 A | 5/1998 | Marks et al. |
| 5,761,647 A | 6/1998 | Boushy |
| 5,762,552 A | 6/1998 | Vuong et al. |
| 5,770,533 A | 6/1998 | Franchi |
| 5,797,794 A | 8/1998 | Angell |
| 5,800,269 A | 9/1998 | Holch et al. |
| 5,823,879 A | 10/1998 | Goldberg et al. |
| 5,830,067 A | 11/1998 | Graves et al. |
| 5,830,068 A | 11/1998 | Brenner et al. |
| 5,830,069 A | 11/1998 | Soltesz et al. |
| 5,836,817 A | 11/1998 | Acres et al. |
| 5,857,911 A | 1/1999 | Fioretti et al. |
| 5,901,211 A | 5/1999 | Dean et al. |
| 5,917,725 A | 6/1999 | Thacher et al. |
| 5,949,411 A | 9/1999 | Doerr et al. |
| 5,971,271 A | 10/1999 | Wynn et al. |
| 5,971,849 A | 10/1999 | Falciglia |
| 5,978,770 A | 11/1999 | Waytena et al. |
| 5,984,779 A | 11/1999 | Bridgeman et al. |
| 5,987,421 A * | 11/1999 | Chuang .................... 705/7 |
| 6,024,640 A | 2/2000 | Walker et al. |
| 6,039,648 A | 3/2000 | Guinn et al. |
| 6,049,823 A | 4/2000 | Hwang |
| 6,089,982 A | 7/2000 | Holch et al. |
| 6,093,100 A | 7/2000 | Singer et al. |
| 6,101,477 A | 8/2000 | Hohle et al. |
| 6,110,041 A | 8/2000 | Walker et al. |
| 6,113,495 A | 9/2000 | Walker et al. |
| 6,120,024 A | 9/2000 | Lind |
| 6,264,560 B1 | 7/2001 | Goldberg et al. |
| 6,269,446 B1 | 7/2001 | Schumacher et al. |
| 6,508,709 B1 | 1/2003 | Karmarkar |
| 2002/0166126 A1 | 11/2002 | Pugh |

FOREIGN PATENT DOCUMENTS

| | | |
|---|---|---|
| WO | WO-95/30944 | 11/1995 |
| WO | WO-95/34040 | 12/1995 |
| WO | WO 97/44750 | 11/1997 |
| WO | WO-9840141 | 9/1998 |

OTHER PUBLICATIONS

Pot-O-Gold, 19" Touchscreen Multi-Game Terminal Superpick Lotto Play Description.
Pot-O-Gold, 19" Touch screen Multi-Game Terminal Touch 6 Lotto Play Description.
Pot-O-Gold, 19" Touch screen Multi-Game Terminal Touch 6 Lotto Technical Description.
Pot-O-Gold, 19" Touchscreen Multi-Game Terminal Supergold Bingo Play Description.
Casinolink, Mikohn Worldwide.
Casinolink System, Mikohn Worldwide.
QuikTrack, Quick Track Gaming, Inc.
Oasis II, CDS Systems and Services.
The Future of Gaming Today, Casino Data Systems.
Casino Systems Solutions, IGT International Game Technology.
Welcome to Casino Data Systems, Casino Data Systems.
Introducing A World Of Opportunities, Bally Systems.
Software Offerings, Advanced Computer Services.
SafeJack, Mikohn Worldwide.
Standing Stone Gaming: Open Gaming Protocol (OGP) Specification, Integrated Performance Decisions, Version 2.1, pp. 1-58, dated Apr. 5, 1999.
Yerak, Becky, At cashless slots: You've got mail, and a jackpot, USA Today, Nov. 13, 2000, Page 2E.
Monteau, Harold, National Gaming Indian Commission.
Washburn, Kevin K., National Gaming Indian Commission.
*AT&T Corp.* v. *Coeur D'Alene Tribe,* 45 F. Supp. 2d 995 (D. Idaho 1998).
S. 692, 106th Congress, 1st Session.
H.R. 3125, 106th Congress, 2d Session.
Amendment in the Nature of a Substitute H.R. 3125, Offered by Mr. Goodlatte of Virginia.
"Casino Systems Solutions", *IGT International Game Technology,* (1997).
"Introducing a World of Opportunities, Bally Systems", *Bally Systems.*
Monteau, Harold "National Gaming Indian Commission".
Washburn, Kevin K., "National Gaming Indian Commission".
"AT&T Corp. v. Coeur D'Alene Tribe, 45 F. Supp. 2d 995 (D. Idaho 1998)", (1998).
"S. 692, 106th Congress, 1st Session".
"H.R. 3125, 106th Congress, 2d Session".
"Amendment in the Nature of a Substitute H.R. 3125, Offered by Mr. Goodlatte of Virginia".
Yerak, Becky "At Cashless Slots: You've got mail, and a jackpot", *USA Today,* (Nov. 11, 2000), 2E.
Banks, Michael A., "America Online: A Graphics-Based Success" *Link-UP,* (Feb. 1992),pp. 12, 14 and 15.
"Pot-O-Gold", *19" Touchscreen Multi-Game Terminal Toucheasy Keno Play Description* (2 pages).
"Pot-O-Gold". *19" Touchscreen Multi-Game Terminal Superpick Lotto Play Description* (2 pages).
"Pot-O-Gold", *19" Touchscreen Multi-Game Terminal Touch.6 Lotto Play Description* (2 pages).
"Pot-O-Gold", *19" Touchscreen Multi-Game Terminal Touch 6 Lotto Technical Description* (1 page).
"Pot-O-Gold", *19" Touchscreen Multi-Game Terminal Supergold Bingo Play Description* (2 pages).
"Casinolink", *Mikohn Worldwide* (4 pages).
"Casinolink System", *Mikohn WorldWide* (8 pages).
"QuickTrack", *Quick Track Gaming. Inc.* (44 pages).
"Oasis II", *CDS Systems and Services.*
"The Future of Gaming Today", *Casino Data Systems* (6 pages).
"Welcome to Casino Data Systems", Casino Data Systems (5 pages).
"Software Offerings, Advanced Computer Services", (8 pages).
"SafeJack", *Mikohn WorldWide* (15 pages).
"Standing Stone Gaming: Open Gaming Protocol (OGP) Specification", *Integrated Performance Decisions, Version 2.1,* (Apr. 5, 1999),1-58.

"GlobeSpan Technology Partners Releases TotemasterÃ??, Its OnLine Pari-Mutual Totalization System", *PR Newswire, New York,* (Feb. 22, 2000),1-3.

"U.S. Appl. No. 11/475,042 Final Office Action", Mar. 12, 2010, 9 pages.

* cited by examiner

Meet Me

When
- Now
- 2 Minutes
- 5 Minutes
- 10 Minutes

Where
- Room
- Lobby
- Vehicle
- Restaurant

Message that will be sent:
"Tom ... Meet Sue in the Lobby in 2 Minutes."

Send Message    Exit

FIG. 6D

Tom Jones & Pat Jones are online.
What would you like to do?

Send Message

Locate

OK    Exit

For the next 8 hours, a message will be sent to Tom Jones instructing Tom to contact you!

What would you like to do?

Send Another Message

Locate Patron(s)

OK

Return to Main Menu

FIG. 6G

Would you like us to send a Message to Tom Jones instructing Tom to contact you when Tom is back on-line?

Send for 8 Hours

Send for 24 Hours

Send for 48 Hours

OK

Don't Send

SYSTEM, METHOD, AND ARTICLE OF MANUFACTURE FOR LOCATING AND COMMUNICATING WITH A PATRON AT A HOSPITALITY FACILITY

RELATED APPLICATIONS

This application is related to U.S. patent application Ser. No. 09/488,556, filed Jan. 21, 2000, U.S. patent application Ser. No. 08/877,375, filed Jun. 17, 1997, U.S. patent application Ser. No. 08/719,651, filed Sep. 25, 1996, now U.S. Pat. No. 5,674,128, and U.S. Pat. No. 9,689,841, now U.S. Pat. No. 7,128,652, entitled "System, Method, and Article of Manufacture for Gaming from an Off-Site Location," filed concurrently herewith. The contents of all the aforesaid applications are hereby incorporated by reference.

BACKGROUND OF THE INVENTION

A. Field of the Invention

The present invention relates to locating a patron or communicating with a patron, and more particularly, to a system, method, and article of manufacture for locating or communicating with a patron at a hospitality facility.

B. Background Information

Most hospitality facilities, such as hotels, motels, amusement parks, theme parks, casinos, and resorts, face many common problems associated with not being able to locate or communicate with their patrons, such as guests. These problems may result in lost revenues for the hospitality facilities and in an inconvenience for patrons.

One problem is that a patron who wants to communicate with a relative, such as a spouse, may not be able to do so easily. For example, in a casino, a husband and a wife, may play a different game at two different player terminals located at the opposite ends of the casino. If, for example, the husband wants to ask his wife to meet him in the lobby in five minutes, the only way to do this may be to physically search for and locate his wife. This not only inconveniences the patrons, but is bad for business. Casinos want to keep patrons at the player terminals as long as possible to maximize revenues and patron gaming time.

Hospitality facilities also face the problem of finding lost patrons. For example, in an amusement park, if a child is lost, the parent or a hospitality facility employee may have to physically search for the child, which may be time consuming, difficult, and cause lost revenues.

In addition, the hospitality facility also may want to communicate with patrons to inform them about the status of an event, or offer a promotion. For example, in a casino, a patron typically plays both offline games, such as keno, and online games, such as player terminals. To maximize gaming time and entertainment value, a patron may buy a keno ticket and then, go play at a player terminal. After a few minutes, however, the patron may have to interrupt play at the player terminal to obtain the results of the keno game. The patron may have to walk to the keno game area to obtain these results. This frustrates the casinos desire to keep patrons at the player terminals as long as possible and inconveniences the patrons.

SUMMARY OF THE INVENTION

A method consistent with the present invention for locating a patron at a hospitality facility including a server and a plurality of client terminals may include receiving, from one of the plurality of client terminals, a patron identifier identifying a patron and a location identifier identifying a location in the hospitality facility, and storing the location identifier in an account corresponding to the patron identified by the patron identifier. The method also may include receiving, from a client terminal, a request for the location of a particular patron, retrieving, from an account corresponding to the particular patron, a location identifier for the particular patron, and sending a message based on the location identifier for the particular patron.

Another method consistent with the present invention for communicating with patrons at a hospitality facility including a server and a plurality of client terminals may include requesting, at a client terminal, a list of patrons at the hospitality facility, receiving, from the server, the list of patrons, selecting at least one patron from the list of patrons, and sending a message to the selected patron.

Still another method consistent with the present invention for identifying the location of patrons at a hospitality facility including a server and a plurality of client terminals, may include requesting, by a client terminal, a list of patrons at the hospitality facility, receiving, from the server, the list of patrons, displaying the list of patrons, receiving, from the client terminal, a selection indicating at least one patron from the list of patrons, requesting, from the server, location information for the at least one patron, and receiving, from the server, location information for the at least one patron.

A computer-readable medium consistent with the present invention contains instructions for causing a computer to perform a method for locating a patron at a hospitality facility including a server and a plurality of client terminals. The method may include receiving, from a client terminal, a request for the location of a particular patron, retrieving, from an account corresponding to the particular patron, the location identifier for the particular patron, and sending a message based on the location identifier for the particular patron.

Another computer-readable medium consistent with the present invention contains instructions for causing a computer to perform a method of communicating with patrons at a hospitality facility including a server and a plurality of client terminals. The method may include requesting, at a client terminal, a list of patrons at the hospitality facility, receiving, from the server, the list of patrons, selecting at least one patron from the list of patrons, and sending a message to the selected patron.

Still another computer-readable medium consistent with the present invention includes instructions for causing a computer to perform a method of identifying the location of patrons at a hospitality facility including a server and a plurality of client terminals. The method may include requesting, by a client terminal, a list of patrons at the hospitality facility, receiving, from the server, the list of patrons, displaying the list of patrons, receiving, from the client terminal, a selection indicating at least one patron from the list of patrons, requesting, from the server, location information for the at least one patron, and receiving, from the server, location information for the at least one patron.

A system consistent with the present invention for locating and communicating with a patron at a hospitality facility, may include a server including a database to store one or more patron account files. Each patron account file may include a patron identifier, at least one location sending device to send a patron identifier, and at least one client terminal including a receiving device to receive the patron identifier from the location sending device and to send the patron identifier and a location identifier corresponding to the at least one client terminal to the server.

Another system consistent with the present invention for locating and communicating with a patron at a hospitality facility may include a plurality of client terminals and a server. The plurality of client terminals may include means for receiving, from one of the plurality of client terminals, a request for the location of a particular patron, and means for sending the request. The server, which is connected to each of the plurality of client terminals, may include means for receiving the request, means for processing the request, and means for retrieving, from an account corresponding to the particular patron, a location identifier for the particular patron. The means for receiving also sends a message based on the location identifier for the particular patron.

Yet another system consistent with the present invention for locating and communicating with a patron at a hospitality facility may include a plurality of client terminals and a server connected to each of the plurality of client terminals. The plurality of client terminals may include an input device for receiving a request for the location of a particular patron, and a first network interface for sending the request. The server may include a second network interface for receiving the request, a controller for processing the request, and a database server for retrieving, from an account corresponding to the particular patron, a location identifier for the particular patron. The second network interface may also send a message based on the location identifier for the particular patron.

Both the foregoing and the following description are exemplary and explanatory, and are intended to provide further explanation of the claimed invention as opposed to limiting it in any manner.

BRIEF DESCRIPTION OF THE DRAWINGS

The accompanying drawings are incorporated in and constitute a part of this specification and, together with the description, explain the principles of the invention. In the drawings.

FIGS. 6A-6J are graphical illustrations of exemplary menus displayed on client terminals consistent with the present invention.

DETAILED DESCRIPTION

Figure 1:
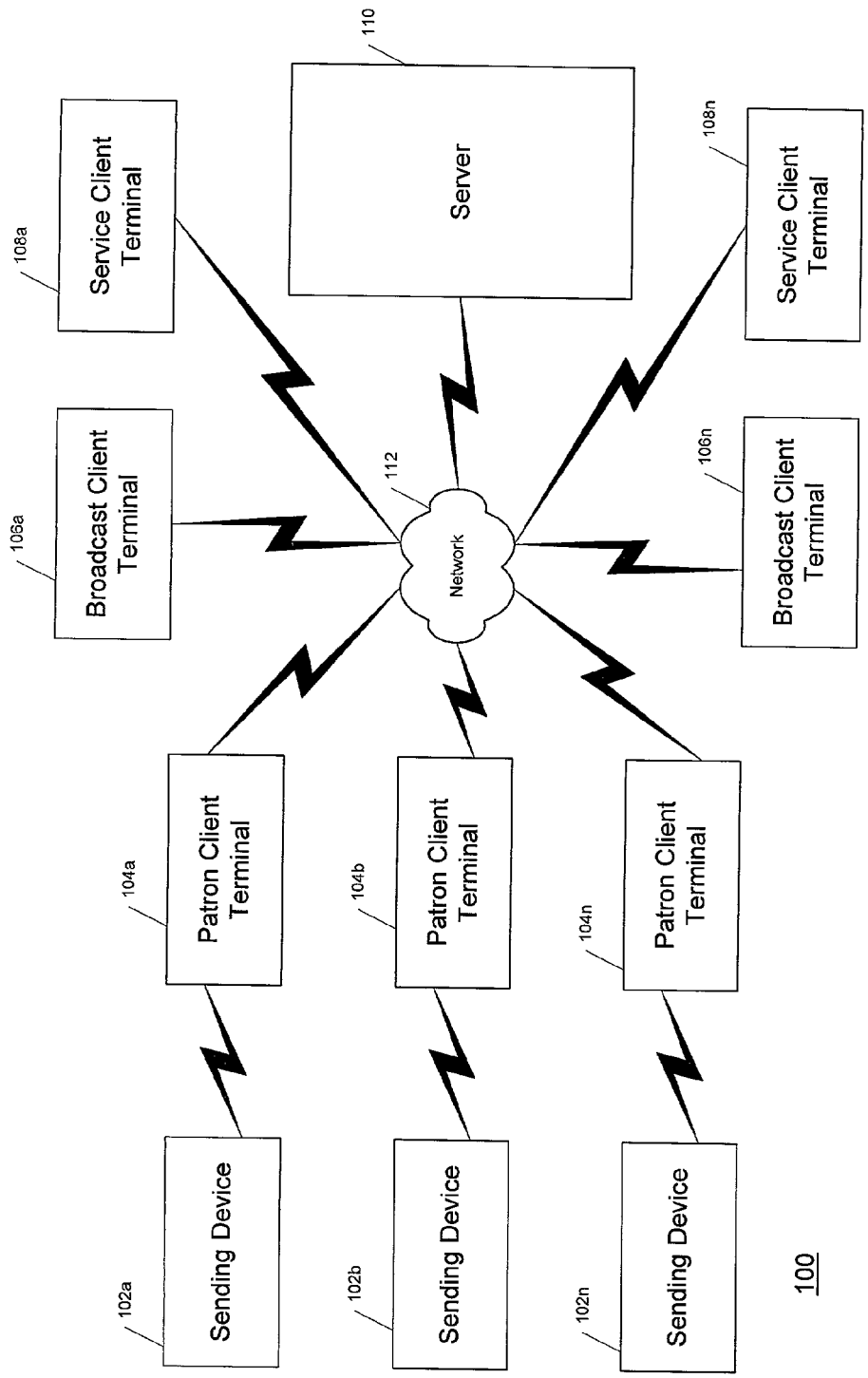
FIG. 1 is a block diagram of an exemplary hospitality facility system consistent with the present invention.

The following detailed description refers to the accompanying drawings. Although the description refers to exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Systems, methods, and articles of manufacture consistent with the present invention allow a user, such as a patron or a person affiliated with a hospitality facility, to locate or communicate with another patron at a hospitality facility. For example, systems, methods, and articles of manufacture consistent with the present invention may assign to each patron a unique patron identifier (e.g., account number) and a sending device (such as a magnetic card or a transmitter). Moreover, each location in the hospitality facility (e.g., restaurant, hotel lobby, and hotel room) may include a unique location identifier and a receiving device (such as a card reader or a receiver). Whenever a patron enters or exits a location, the receiving device may receive, the patron identifier, from the patron's sending device. Then, the receiving device may send, for example, to a server, both the patron identifier and the location identifier for storage. As a result, systems, methods, and articles of manufacture consistent with the present invention may track each location visited by a patron at the hospitality facility.

Furthermore, a user (such as a patron or a person affiliated with the hospitality facility) may locate or communicate with a particular patron using a client terminal or a similar device. After the user enters the name of a particular patron, the client terminal may retrieve the location (or last-known location) from a database on a server. The user may then send a message to the patron or obtain the patron's current location or last-known location. A patron may send a personal message, such as "Meet me in the lobby in five minutes," to another patron. Similarly, a person affiliated with the hospitality facility may inform a patron of the status of an event, such as the status of an offline game, or notify a patron of a promotion. The message may have any type, such as an instant message or an e-mail message. The location information may include text identifying the location, such as "Front Desk," and/or directions to that location.

In addition, systems, methods, and articles of manufactures consistent with the present invention may assist users in finding a lost patron, for example, by sending a message with a photograph of the lost patron to all client terminals in the hospitality facility. Of course, such systems, methods, and articles of manufactures can also facilitate finding lost patrons simply by storing the last-known locations of these patrons.

The foregoing and the following examples are intended to be illustrative of the features of the present invention as opposed to limiting it in any manner. Moreover, systems, methods, and articles of manufacture consistent with the present invention are not limited to any particular hospitality facility, patron, or user. A hospitality facility may include, but is not limited to, hotels, motels, amusement parks, theme parks, casinos, and resorts. A patron may include, but is not limited to, a guest of the hospitality facility. A user may include, but is not limited to, a patron or a person affiliated with a hospitality facility, such as an employee.

FIG. 1 is a block diagram of an exemplary hospitality facility system 100 consistent with the present invention. System 100 may include sending devices 102a-102n, patron client terminals 104a-104n, broadcast client terminals 106a-106n, service client terminals 108a-108n, and a server 110, all interconnected by a network 112. In the following description, a single sending device, a single patron client terminal, a single broadcast client terminal, and a single service client terminal are referred to as a sending device 102, a patron client terminal 104, a broadcast client terminal 106, and a service client terminal 108, respectively. Moreover, patron client terminals 104a-104n, broadcast client terminals 106a-106 and service client terminals 108a-108n are collectively referred to as client terminals.

Sending device 102 may be a magnetic card, a smart card, a credit card, a debit card, a radio frequency transmitter, an infrared frequency transmitter, a magnetic device, or a similar device that can store a patron identifier (e.g., account number). Each patron may have a unique patron identifier. A patron identifier may include letters, numbers, or a combination of both. For example, if the sending device is a credit card, the patron identifier may be the credit card number imprinted on the credit card. In one embodiment, sending device 102 may transmit a patron identifier to, for example, a receiving device of a patron client terminal 104 and/or a service client terminal 108. In another embodiment, sending device 102 comprises jewelry (such as a watch, a pin, a bracelet, a tie clip, or a belt buckle) with a transmitter or some other promotional item (such as a key fob) with a transmitter.

Patron client terminal 104 may be a computer or a similar device that may receive or retrieve patron identifiers, receive information requests from patrons, display information to patrons, and communicate with server 110. Using a patron client terminal 104, a patron at a hospitality facility may locate other patrons or communicate with other patrons at the hospitality facility. Patron client terminals 104a-104n are generally used by patrons of the hospitality facility and may be located throughout the hospitality facility.

In one embodiment, patron client terminals 104a-104n may be the player terminals and/or kiosk terminals disclosed in U.S. patent application Ser. No. 09/488,556 ("'556 application"), filed Jan. 21, 2000; the player terminals disclosed in U.S. patent application Ser. No. 08/877,375 ("'375 application"), filed Jun. 17, 1997, and/or U.S. Pat. No. 5,674,128 ("'128 patent"); and/or the on-site or off-site client terminals disclosed in U.S. Pat. No. 9,689,841, now U.S. Pat. No. 7,128,652, entitled "System, Method, and Article of Manufacture for Gaming from an Off-Site Location" ("'841 application"), filed concurrently herewith. The contents of all the aforesaid, applications are hereby incorporated by reference. Alternatively, patron client terminals 104a-104n may be combined with the player terminals, kiosk terminals, and/or the on-site or off-site client terminals disclosed in the aforesaid applications. In still another embodiment, patron client, terminals 104a-104n may be used to accomplish tasks performed by the player terminals, kiosk terminals, and/or on-site or off-site client terminals disclosed in the aforesaid applications.

Each patron client terminal 104 also may have a unique location identifier, such as a letter, a number, or combinations of both. For example, if the patron client terminal 104 is a computer, the location identifier may be an Internet Protocol (IP) address.

In one embodiment, where sending device 102 is a transmitter, patron client terminal 104 receives a patron identifier from sending device 102 and sends this patron identifier along with the client terminal's location identifier through network 112 to server 110. In another embodiment, where the sending device 102 is a magnetic card, the patron client terminal 104 retrieves the patron identifier from sending device 102 and sends this patron identifier along with the client terminal's location identifier via network 112 to server 110.

As shown in FIG. 1, systems, methods, and articles of manufacture may include one or more broadcast client terminals 106a-106n in addition to the one or more patron client terminals 104a-104n. Broadcast client terminals 106a-106n generally receive messages from server 110 and display the received messages to users. The displayed messages may be promotions, advertisements, or missing patron notices that may include photographs of one or more missing patrons. Broadcast client terminal 106 may be a dummy terminal, a large display board, or any other device for receiving and displaying messages. Each broadcast client terminal 106 also may have a unique location identifier like the patron client terminal 104.

In one embodiment, broadcast client terminal 106 may include an input device and other components to allow a user to respond to a displayed message. For example, if the message is a missing patron notice, the broadcast client terminal 106 may allow a user to input information about the missing patron that may help locate the missing patron. In this embodiment, broadcast client terminal 106 may be a computer or any similar device for displaying information, receiving user input, and communicating with server 110.

As shown in FIG. 1, systems, methods, and articles of manufacture consistent with the present invention also may include one or more service client terminals 108a-108n. Service client terminal 108 may be a computer or a similar device. Service client terminal 108 may interact with server 110 to allow a user to locate or communicate with a patron. Each service client terminal 108 also may have a unique location identifier like the patron client terminal 104.

Generally, service client terminals 108a-108n may be used only by personnel at the hospitality facility. For example, service client terminal 108 may be used by a person affiliated with a hospitality facility to send messages that include promotions, advertisements, or missing patron notices to all or a subset of patron client terminals 104a-104n and broadcast client terminals 106a-106n. Service client terminal 108 also may be used to receive messages from server 110 and display the received messages. In addition, service client terminal 108 also may be used to accomplish administrative and management tasks, such as opening accounts for patrons or generating various internal reports.

In one embodiment, service client terminals 108a-108n may be the service-client stations, customer service stations, the cashier stations, and/or the management and reporting stations disclosed in the '556 application; the cashier station and/or the customer service station disclosed in the '375 application and the '128 patent; and the service client terminals disclosed in the '841 application. Alternatively, the service client terminals 108a-108n may be combined with a system that includes the service-client stations, customer service stations, the cashier stations, the management and reporting stations, and/or service client terminals disclosed in the aforesaid applications. In still another embodiment, the service client terminals 108a-108n may be used to accomplish the tasks performed by the service-client stations, customer service station, the 10 cashier station, the management and reporting station, and/or the service client terminals disclosed in the aforesaid applications. For example, service client terminals 108a-108n may communicate with server 110 to transmit new software and software upgrades to patron client terminals 104a-104n and broadcast client terminals 106a-106n and to remotely reconfigure these client terminals.

As shown in FIG. 1, systems, methods, and articles of manufacture also may include server 110. Server 110 may maintain and control patron client terminals 104a-104n, broadcast client terminals 106a-106n, and service client terminals 108a-108n, and receive patron identifiers and location identifiers from the patron client terminals 104a-104n. In addition, server 110 may include a database for storing patron account files for each patron. Each patron account file may include the patron's identifier, the patron's identification information (e.g., name, address, and/or date of birth), the patron's preference information (e.g., preferred beverage, snack, language, restaurant, and/or golf course), the patron's location information (e.g., including the location identifiers corresponding to the locations visited by the patron while at the hospitality facility), and an address book. The address book may include information about other patrons and may be used by a patron to locate these other patrons and/or communicate with these other patrons at the hospitality facility.

The database of server 110 also may store client terminal files for each client terminal located in the hospitality facility. Each client terminal file may include the location identifier of the client terminal, the physical location of the client in the hospitality facility, and the identification information, such as a patron identifier, of the user(s) who have used the client terminal.

Server 110 may process location requests received from patron client terminals 104a-104n and transmit messages (e.g., in the form of text, graphics, video, audio) and other data to patron client terminals 104a-104n, broadcast client terminals 106a-106n, and service client terminals 108a-108n for display or further processing. Server 110 may be located in a secured area of the hospitality facility, accessible by authorized personnel only. In the embodiment of FIG. 1, only one server 110 is shown. As the size of network 112 grows, however, additional servers may be added.

In one embodiment, server 110 may be the amenities server disclosed in the '556 application. Alternatively, server 110 may be combined with a system that includes the amenities server and/or transaction processor subsystem disclosed in the '556 application; the central control network, the games server, and/or the terminal server disclosed in the '375 application and/or the '128 patent; and/or server 108 disclosed in the '841 application. In still another embodiment, server 110 may be used to accomplish tasks performed by the amenities server and/or transaction processor subsystem disclosed in the '556 application; the central control network, the games server, and/or the terminal server disclosed in the '375 application and/or the '128 patent; and/or server 108 disclosed in the '841 application. For example, server 110 may assist a patron in purchasing wagers, which may be revealed from an off-site location.

Network 112 may be a single or a combination of any type of computer network, such as a Local Area Network (LAN) or a Wide Area Network (WAN). For example, network 112 may comprise an Ethernet network according to the IEEE 802.3 standard.

While the components of FIG. 1 are shown as logical devices, one skilled in the art would readily understand that each can be associated with a respective physical device. For example, as described in the foregoing description, server 110 may be a computer. In addition, it will be apparent to one skilled in the art that as the size of the network grows and the number of transactions increase, additional servers may be added. Also, it will be known to those skilled in the art that server 110 and the client terminals may use a single or a combination of protocols and technologies to communicate with each other. For example, server 110 and client terminals may use Hypertext Transfer Protocol (HTTP) and Transmission Control Protocol/Internet Protocol (TCP/IP) for transport and Hypertext Markup Language (HTML) for presenting information to users.

Furthermore, other system and network configurations will be known to those skilled in the art. For example, in an alternative embodiment, instead of having separate broadcast client terminals 106a-106n and/or separate service client terminals 108a-108n, one or more of the patron client terminals 104a-104c may be used as broadcast client terminals and/or service client terminals.

One skilled in the art would appreciate that systems, methods, and articles of manufacture consistent with the present invention also may be implemented either singly or in combination with the inventions disclosed in the '556 application, '375 application, '128 patent, and/or the '841 application.

In accordance with one embodiment of the present invention, a patron wishing to use hospitality system 100 may establish a patron account for storage in server 110 and receive a sending device (e.g., magnetic card). This account may be established, for example, at a service client terminal 108, which may be located at the front desk of a hotel. In one embodiment, the service client terminal 108 may be operated by an employee of the hospitality facility. In another embodiment, the service client terminal 108 may be unmanned, obtaining information from a patron through a series of interactive menus. To establish an account, the patron may need to provide some identifier information (e.g., name, address, and/or date of birth) and preference information (e.g., preferred beverage, snack, language, restaurant, and/or golf course). Once the patron provides the requested information, the information is sent to the server 110, which in turn establishes a patron account file for the patron and issues the patron a unique patron identifier. In addition, during account establishment, the patron may be asked to select a personal identification number ("PIN") via a keypad. The patron identifier may be stored on a sending device 102, such as a magnetic card. In another embodiment, in addition to storing the patron identifier, an encrypted version of the PIN also may be stored on a sending device 102.

In still another embodiment, the patron's identifier information and preference information could be sent to the system 100 before the patron arrives at the hospitality facility, for example, via the Internet, so that the patron's sending device would be ready when the patron arrived at the hospitality facility.

For some types of sending devices 102a-102n, a number preassigned to the sending device may be used as the unique patron identifier and thus, server 110 need not generate a patron identifier. For example, if the sending device is a credit card or a debit card, the account number on the credit card or debit card may be used as the patron identifier.

Figure 2:
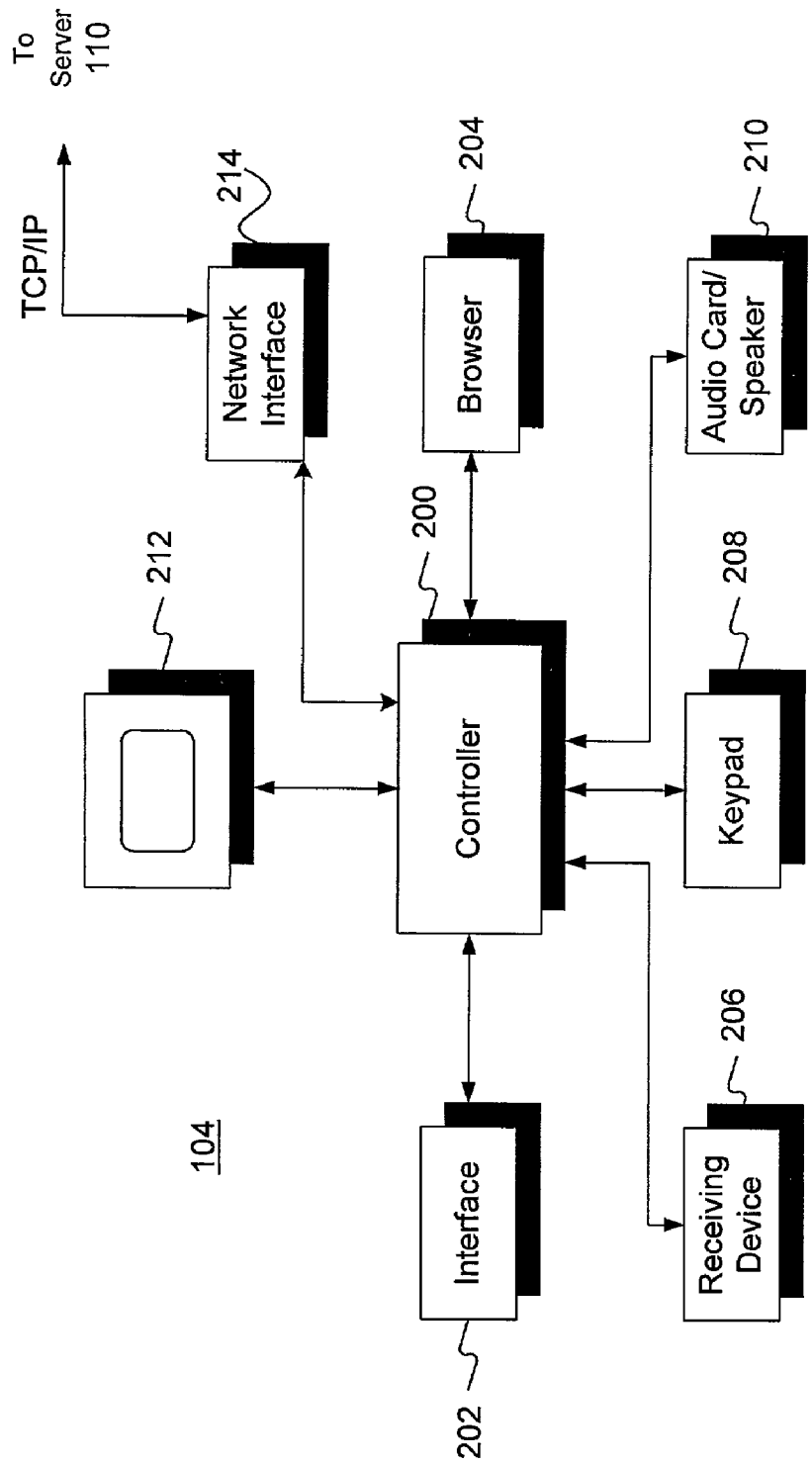
FIG. 2 is a block diagram of an exemplary patron client terminal consistent with the present invention.

FIG. 2 is a block diagram of an exemplary patron client terminal consistent with the present invention. As shown, a patron client terminal 104 may include a controller 200, an interface 202, a browser 204, a receiving device 206, a keypad 208, an audio card/speaker module 210, a video display with touch screen capability 212, and a network interface 214.

Controller 200 may include a processor and/or memory. Interface 202 may include a software application for displaying attract mode graphics to attract a patron to patron client terminal 104.

Browser 204 may include a conventional software application, such as NETSCAPE NAVIGATOR or INTERNET EXPLORER, for issuing HTTP requests to the server 110. For example, browser 204 may request a specific web page or ask the server 110 to perform a database query. Browser 204 also may read HTML codes embedded in the web pages received from the server 110 to determine how, where, and in what colors and fonts the elements on the web pages must be displayed.

Receiving device 206 may include a magnetic card reader, a smart card reader, a radio frequency receiver, an infrared frequency receiver, a magnetic device detector, or any similar device known to those skilled in the art that retrieves or receives patron identifier information. The type of sending device 102 may dictate the type of receiving device 206.

Keypad 208 may comprise a conventional alphanumeric or numeric key entry device. Keypad 208 may, for example, permit a patron to enter a PIN to verify the identity of the patron at the patron client terminal 104. A keypad may not be necessary since patron may be able to input the PIN using the touch screen on video display 212.

Audio card/speaker module 210 may comprise a conventional audio card, amplifier, and speaker for presenting audio.

Video display 212 may comprise a conventional touch screen video monitor for displaying video graphics and receiving patron inputs, such as a PIN. A touch screen may not be necessary, however, since patron inputs can be made through keypad 208.

Network interface 214 transmits the requests from, for example, browser 204 to server 110. The requests may be broken into HTTP packets that are sent across a TCP/IP network 112 to the server 110. Network interface 214 also may receive incoming messages addressed to patron client terminal 104. In addition, network interface 214 may check for errors in transmission using, for example, cyclical redundancy check ("CRC").

Although not shown, patron client terminal 104 may include a printer device to print information received from the server 110 or other information. Moreover, patron client terminal 104 also may include other input devices, such as a pointing device (e.g., trackball or mouse) and a keyboard. In addition, patron client terminal 104 also may include head phones, for example, to listen to messages, and text-to-speech and/or speech-to-text conversion software, respectively, to listen to received messages and/or to send messages.

Furthermore, although not shown, the service client terminal 108 and the broadcast client terminal 106 also may include all or some of the components that are included in a patron client terminal 104. In one embodiment, service client terminal 108 also may include a device that can write to the sending device. For example, if the sending device is a magnetic card, service client terminal 108 may include a magnetic card issuance system like the one disclosed in the '556 patent application. Service client terminal 108 also may include a scanning device for scanning and storing a patron's signature or photograph or scanning a patron's drivers license. In another embodiment, service client terminal 108 may include recognition software to detect the patron's identifier information, such as name, address, and/or date of birth, from the patron's drivers license.

Figure 3:
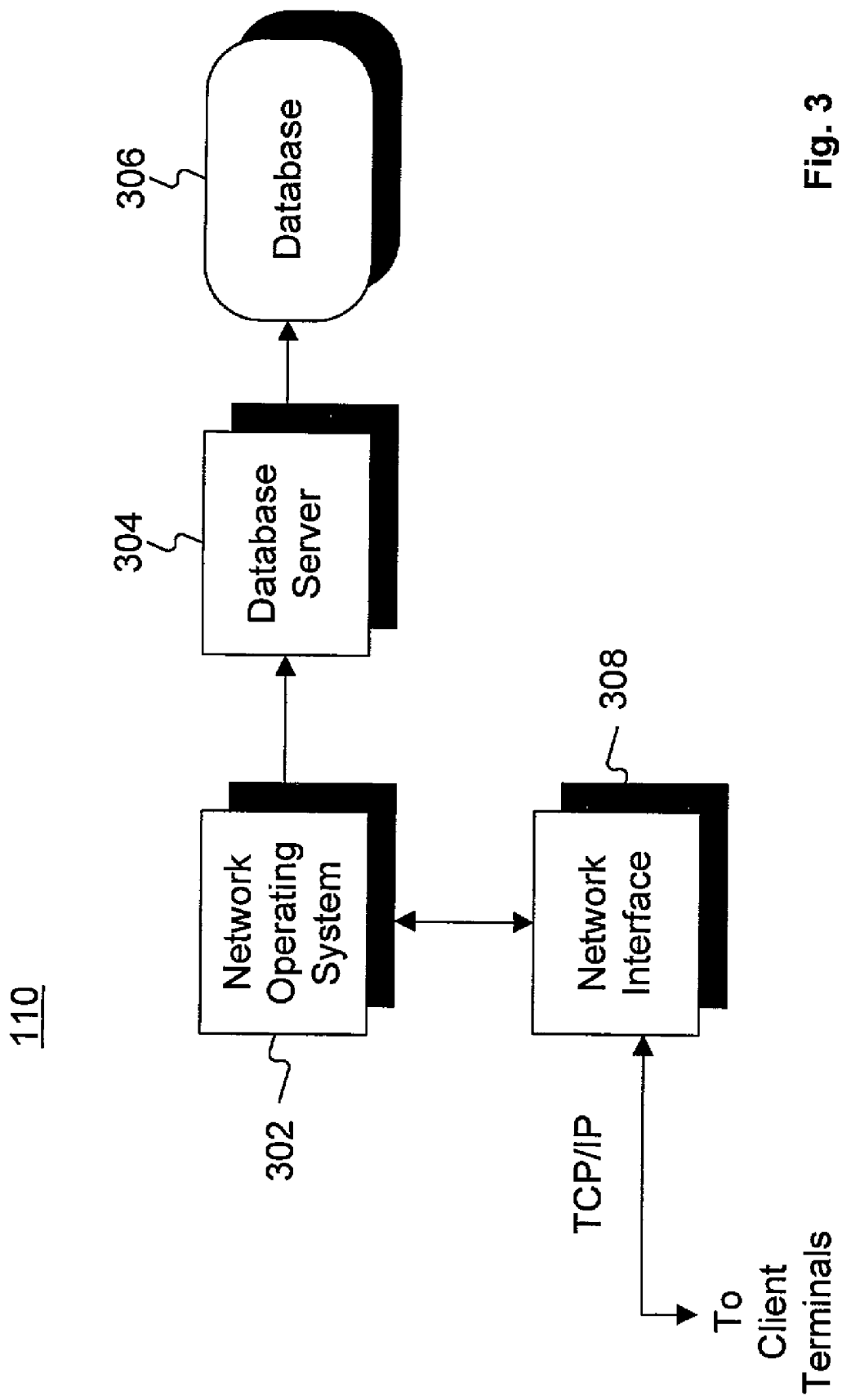
FIG. 3 is a block diagram of an exemplary server consistent with the present invention.

FIG. 3 is a block diagram of an exemplary server 110 consistent with the present invention. As shown, server 110 may include network operating system 302, a database server 304, a database 306, and a network interface 308. Network operating system 302 may include a conventional network operating system, such as WINDOWS NT SERVER. Network operating system 302 may process requests from client terminals, monitor network hardware and software, coordinate communication in the network, and provide transaction security.

Database server 304 may build and maintain database 306. In addition, database server 304 may retrieve from database 306 patron account information, client terminal information, graphical menus, and other multimedia information responding to requests from the client terminals. Furthermore, the database server 304 may be a SQL server.

Database 306 may store patron account files, client terminal files, graphical menus, an internal mapping of the hospitality facility, and other multimedia information. In one embodiment, the internal mapping may be used to derive a map for giving a user directions to the location of a patron. In another embodiment, database 306 may be a relational database.

Similar to network interface 214, which was described above in connection with FIG. 2, network interface 308 may transmit information to and receive information from the client terminals. In addition, network interface 308 may check for errors in transmission using, for example, CRC.

In accordance with one embodiment of the present invention, each location in a hospitality facility (e.g., restaurant, hotel lobby, and hotel room) may include at least one client terminal. To track each patron's movement throughout the hospitality facility, for example, the hospitality facility may require each patron to log onto a client terminal whenever a patron enters a location and/or log off from the client terminal whenever the patron exits the location. Alternatively, the logon and logoff may be automatic, as in the case where the sending device is a transmitter carried or worn by the patron.

Whenever a patron logs on or logs off a client terminal, the receiving device 206 of the client terminal may send the patron identifier, the location identifier, the event (e.g., logon or logoff), and date and/time of the logon or logoff to server 110, which in turn updates database 306. In this embodiment, server 110 may update the patron's account file in database 306 with information, such as date and time of entry and/or exit, and location identifier. In another embodiment, however, server 110 also may update the client terminal file with information, such as date and time of entry and/or exit, and patron identifier. Consequently, when a user is trying to locate a patron server 110 may do so either by searching the patron's account file for the location identifier or by searching the client terminal files for the patron identifier of that patron. These and other methods of storing and querying a database are known to those skilled in the art and are also within the scope of the present invention. Moreover, it will be apparent to one skilled in the art that database 306 may either contain a list of all locations or a set number of locations, such as the last five locations, that the patron has visited.

Depending on the sending device and receiving device, the patron may need to take an action to log on or log off the client terminal. For example, if the sending device is an infrared or radio frequency transmitter, the patron may not need to take any action as long as the transmitter can communicate with a receiver. As a result, a patron may move from one location to another in a hospitality facility and the location information may be updated automatically. On the other hand, if the sending device is a magnetic card, the patron may need to insert the card into a receiving device 206, such as a card reader, to log onto the client terminal. In one embodiment, the client terminal may ask the patron whether the patron is entering or leaving the particular location.

In another embodiment, if the patron selected a PIN during account establishment, the patron may need to enter the PIN to log on the client terminal. In still another embodiment, if the patron selected a PIN during account establishment, the patron may be required to enter a PIN depending on the type of client terminal used by the patron. For example, the patron might not be required to enter a PIN at a client terminal in the entry/exit of a restaurant. On the other hand, if the client terminal is player terminal like the one described in the '556 application and the patron is using the player terminal to gamble, the patron may be required to enter the PIN. These and other embodiments will be apparent to those skilled in the art from the foregoing and following description, and thus, are also within the scope of the present invention.

In accordance with one embodiment of the present invention, to locate or communicate with other patrons, the hospitality facility may require that patrons create an address book containing the identity of other patrons, such as family and friends. The hospitality facility may further require that the other patrons agree to being included in the patron's address book. The address book may be created during account establishment or after account establishment. In an alternative embodiment, a blank address book may be automatically created for each patron during account establishment and the patron may add patrons to this address book during or after account establishment.

Figure 4:
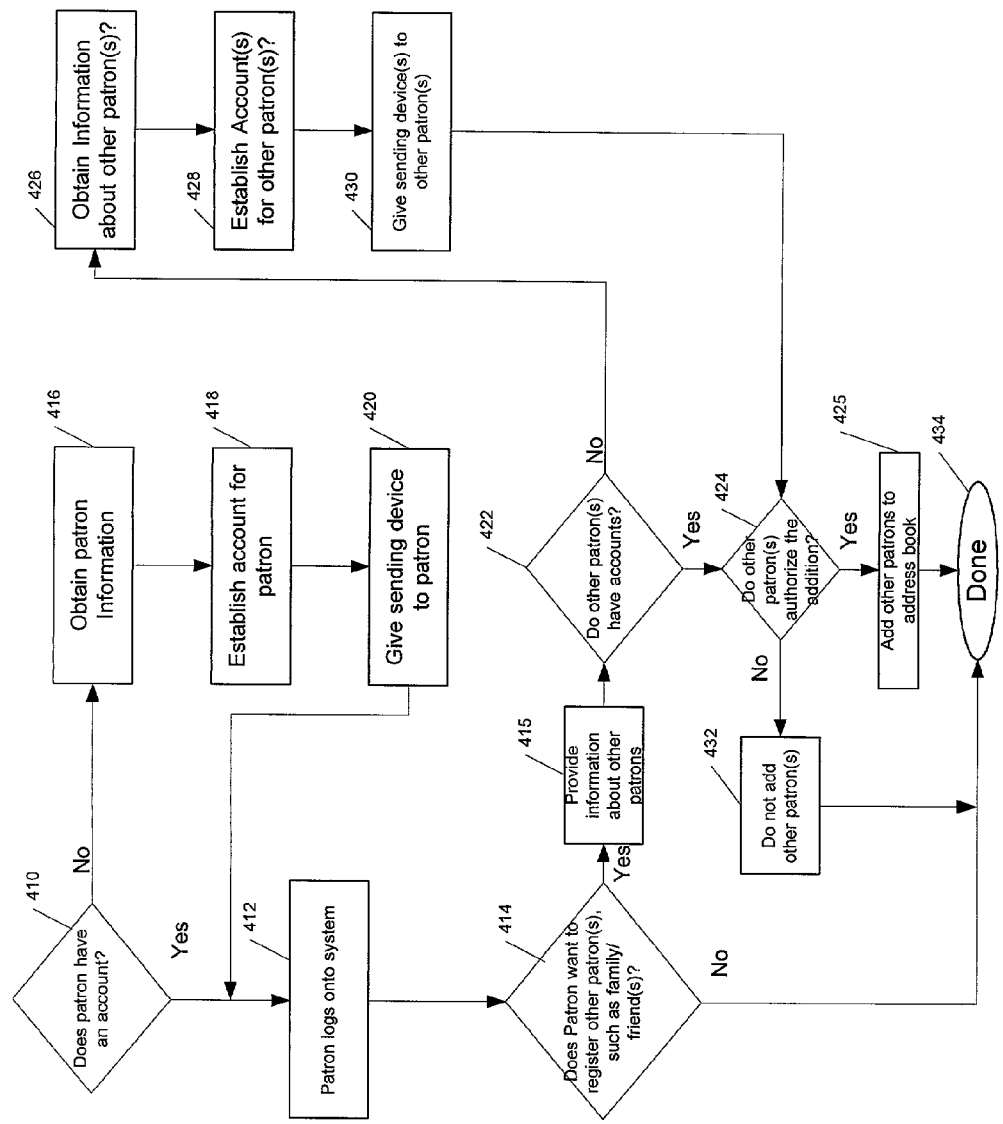
FIGS. 4 and 5 are flow diagrams of an exemplary method of operating a system consistent with the present invention.

Referring to FIG. 4, the process of establishing an account and adding patrons to the address book will be described now in detail. If the patron already has an account, then the patron may log onto system 100 (steps 410 and 412). On the other hand, if a patron does not have an account, the patron may need to establish an account (step 410). As described in the foregoing description, to establish an account, the patron may need to provide some identifier information (e.g., name, address, and/or date of birth) and preference information (e.g., preferred beverage, snack, language, restaurant, and/or golf course) (step 416). The patron's photograph may be taken and stored in database 306 for identification and for finding the patron in case he or she gets lost (step 416). The patron also may be asked to select a PIN (step 416).

In addition, the patron also may be asked to select other users, including other patrons and hospitality facility personnel, so that these users can add the patron to their address book and/or can access the patron's information. In this embodiment, the users may not be able to add the patron to their address book and/or access patron information unless the patron gives permission to the users (step 416). In an alternative embodiment, all users may have access to the patron information and/or may add the patron to their address book unless the patron restricts permission. (step 416). In still another embodiment, the patron may not be able to restrict hospitality personnel from accessing his or her information, or from adding the patron to their address books.

Once the patron provides all the requested information, service client terminal 108 may send the information to server 110, which in turn may establish a patron account file for the patron in database 306 and issue a unique patron identifier to the patron (step 418). The patron identifier (and the PIN, if required,) may then be stored on sending device 102. For example, if the sending device is a magnetic card, the patron identifier (and if required, an encrypted version of the PIN) may be stored on the card. In another embodiment, as described in the foregoing description, an identifier already associated with a sending device 102 may be used as the patron identifier as long as it uniquely identifies a patron. In this case, the identifier associated with the sending device 102 may be entered and stored in the patron's account file.

Next, sending device 102 may be given to the patron (step 420). Once the patron receives the sending device, the patron may log onto system 100 (step 412). In another embodiment, since the patron just established an account, the patron may not need to log onto system 100.

Once the patron logs onto system 100 at a service client terminal 108 or patron client terminal 104 (step 412), server 110 may send a selection menu to the client terminal. The menu may include an option asking the patron whether the patron wants to add other patrons, such as friends and/or family, to his or her address book (step 414). If the patron does not want to add other patrons, then, the patron is done (step 434). On the other hand, if the patron does want to add other patrons, the patron may need to provide information, such as patron identifiers or names of other patrons (step 415).

Next, server 110 determines whether these other patrons have accounts, for example, by querying database 306 (step 422). If so, server 110 determines whether these other patrons have agreed to be included in the patron's address book (step 424). In an alternative embodiment, the process of adding patrons to an address book is administered by an agent (such as an employee) at service client terminal 108 so that the agent can verify that the patrons to be added to the address book give permission to be found by the patron. If server 110 determines that the user does have permission to add the selected patron, then the server 110 adds the selected patron to the user's address book and the patron is done (steps 424, 425, and 434). On the other hand, if server 110 determines that the patron does not have permission to add other patrons (step 424), then server 110 does not add the other patrons to the patron's address book and the patron is done (steps 432 and 434).

If it is determined that some or all of the other patrons do not have accounts (step 422), these patrons may be asked to establish accounts (steps 426, 428, and 430). Steps 426, 428, and 430 are similar to steps 416, 418, and 420, and thus, will not be described in further detail. Once the other patrons have accounts, server 110 determines whether these patrons have agreed to be included in the requesting patron's address book (step 424). If so, then, server 110 adds the other patrons to the requesting patron's address book (step 425). On the other hand, if server 110 determines that the patron does not have permission to add other patrons (step 424), then server 110 does not add the other patrons to the patron's address book and the patron is done (steps 432 and 434). The process of adding other patrons is now complete (step 434).

Patrons may use keypad 208 or the touch screen capabilities of video display 212, for example, to establish an account and to add other patrons to their address book. Moreover, while the process was described with reference to patrons, other users, such as hospitality facility personnel, may similarly establish address books and add particular patrons to their address books.

Although the process of adding patrons to an address book is shown in FIG. 4 as being separate from the process of establishing an account, those of ordinary skill in the art would appreciate that these processes may be combined. Moreover, the address lists may be pre-established before the patron arrives at the hospitality facility. For example, the patron and his/her family and friends may submit requests to include one another on their respective address books. In yet another embodiment, the system 100 may automatically place travel companion's on one another's address book provided the system is informed that the patrons are in fact travel companions.

Moreover, although not shown in FIG. 4, after adding other patrons to a patron's address book (step 425), the patron may be given the option of creating groups in the address book. Each group may include other patrons who were added by the patron to his or her address book. In addition, it will be apparent to one skilled in the art that a patron may be given the option of creating a group at a later time, for example, during a subsequent logon onto a client terminal.

The process of locating or communicating with patrons will be described by referring to FIG. 5 and FIGS. 6A-6J. It is assumed that the user has already followed the steps in FIG. 4 to establish an account and has added the other patrons to his or her address book. Furthermore, it is assumed that if the user is a patron, the user may be using patron client terminal 104 and if the user is a person affiliated with the hospitality facility, then the user may be using service client terminal 108 to locate and/or communicate with other patrons. It is also assumed that the user has logged on at the client terminal and that the patron identifier corresponding to the user has been sent to the server.

Figures 6A, 6B:
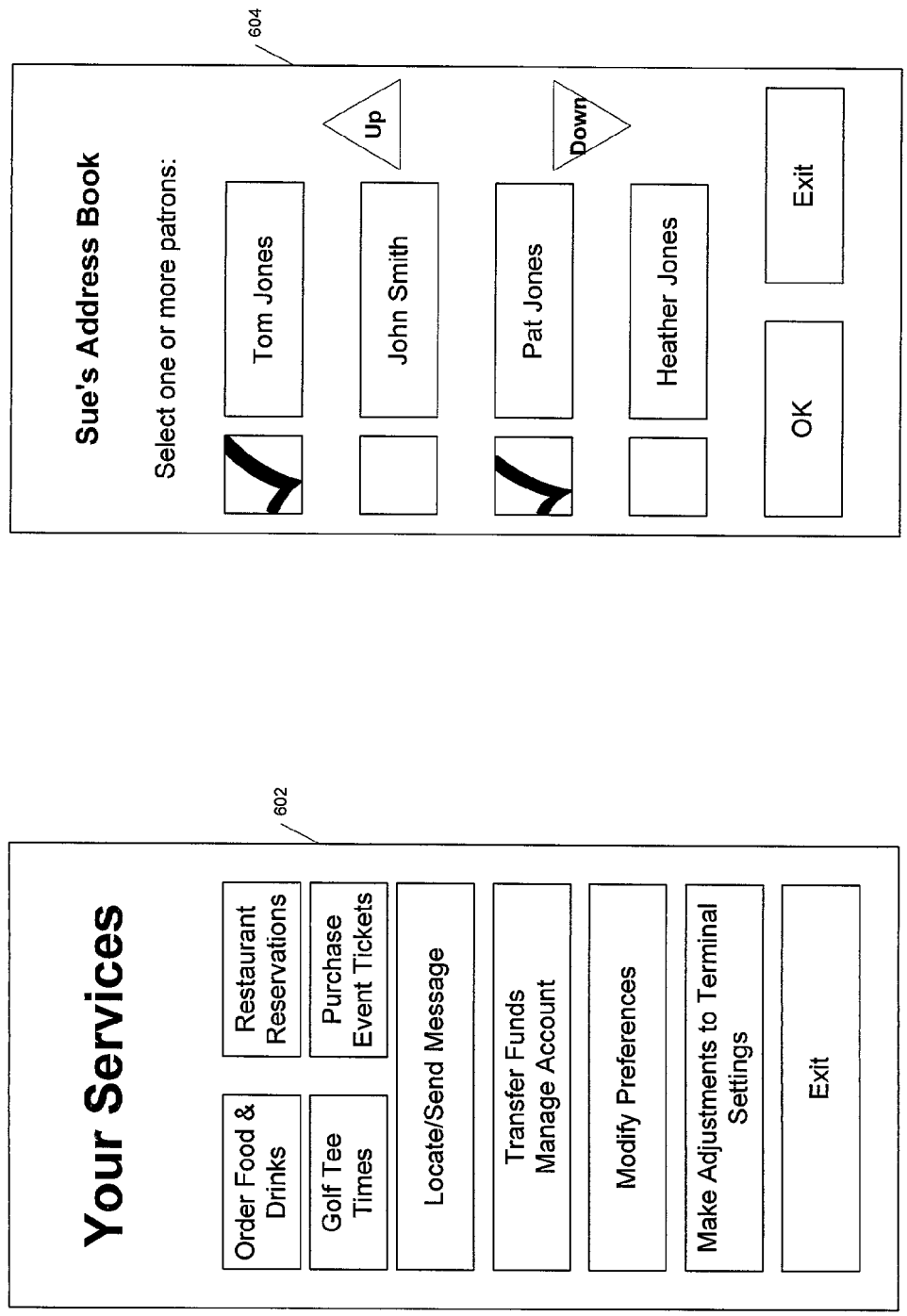

Using a client terminal, the user may select the "Locate/Send Message" option from an exemplary menu 602, as shown in FIG. 6A (step 510). The client terminal may request the user's address book from the server 110. Next, the client terminal may display the user's address book (step 512), such as address book 604 shown in FIG. 6B. The user may then select the patron to be located or to whom a message should be sent (step 514). This selection is sent to the server 110, which in turn determines whether the selected patron are online (step 516). A patron is online if the patron is logged on a client terminal. A variety of methods could be used to determine whether a patron is online. For example, server 110 could compare the patron identifier corresponding to the selected patron to the patron identifiers received from client terminals. Alternatively, a flag may be set in database 306 whenever a patron logs on a client terminal. Server 110 could look up the flag in database 306 to determine whether the selected patron is logged on at a terminal.

If all or some of the selected patrons are online, the user may be asked to select between sending a message and locating the patron (step 522), for example, by displaying several options 606, as shown in FIG. 6C. In an alternative embodiment, the user may be able to choose both options.

If the user chooses locate, then, the server 110 may retrieve the location information (including the location identifier) for the selected patrons from the database 306 (step 524). As described in the foregoing description, server 110 may retrieve location information for a patron either by searching the patron's account file for the location identifier or by searching the client terminal files for the patron identifier of the patron that the user is trying to locate.

Next, the server 110 may send the retrieved location information to the client terminal, which in turn may display the location information for the selected patrons (step 526). In one embodiment, the user may be asked to choose a format for the location information. For example, the user may be given the option of choosing between the name of the location (e.g., "ABC Restaurant"), textual directions, and graphical directions (e.g., a map). If the user chooses textual directions, the server 110 may send textual directions based on the location identifier of the user, the location identifier of the selected patron, and/or the internal mapping of the hospitality facility. For example, the textual directions may be that the selected patron is "located 200 hundred feet away from the user and that the user should exit his/her present location, turn right, turn left at the next hallway, and find the patron 10 feet to the right of the front desk." On the other hand, if the user chooses graphical directions, the server 110 may derive a map based on the location identifier of the user, the location identifier of the selected patron, and/or the internal mapping of the hospitality facility that is stored in database 306.

Conversely, if the user selects the send message option (step 522), the user may be prompted to enter a message (step 534). In one embodiment, the server may display various message options 608 and ask the user to select one of them, as shown in FIG. 6D. In another embodiment, the user may use the keypad 208 and/or a keyboard to enter a customized message. Once the user enters the message, the client terminal sends the message to server 110. The server 110 then retrieves the location information for the selected patron and sends the message to the patrons based on this location information (steps 536 and 538). For example, if the selected patron is using a client terminal, server 110 may retrieve the location identifier for that client terminal and send the message to the client terminal using the location identifier. Although not shown, in one embodiment, an acknowledgment message may be displayed to the user indicating, for example, whether the message was successfully delivered. An exemplary acknowledgment message 610 is shown in FIG. 6E. An acknowledgment message also may indicate to the user whether the selected patrons has opened or read the message.

The message sent by the user can take an infinite number of different forms. For example, where the user is a patron, the message is typically a personal message, such as "Meet me in the lobby in five minutes." In addition, the message is typically sent to patron client terminals 104a-104n. On the other hand, if the user is a person affiliated with the hospitality facility, the message may be a status, a promotional, or a notification message. The status message may notify a selected patron of the status of an offline game (e.g., keno or bingo or a horse race). For example, the status message may notify the patron of a win, a loss, or the progress of the game. A promotional message may be a message about a promotion that is being offered by the hospitality facility. For example, a promotional message may include a dinner special or the chance to enroll in a lottery. A notification message may be a message notifying a patron of an event, for example, that a boxing match is scheduled to begin in fifteen minutes or that the patron's table is ready at a restaurant. It will be apparent to one skilled in the art that the messages are not limited to a status, a promotional, or a notification message. Moreover, a message may be based on preference, location, or gaming information stored in the patron's account. For example, if a patron likes baseball, the message may be a live data stream message that scrolls across the bottom of the video display of the patron's client terminal and that informs the patron of the baseball scores of a game in progress. In another example, depending on a patron's location, the message may offer one-half price sandwiches at a restaurant located nearby.

As discussed above, the messages may comprise status messages. An example will illustrate the use of status messages in casinos. In one embodiment, a patron may proxy play an offline game (such as bingo, keno, or a sporting event) and, at the same time, play on a player terminal. When some predetermined event concerning the offline game occurs (e.g., the game starts, the patron is within two plays of winning, the patron has won the game, or the game is over), server 110 may automatically locate the patron at a player terminal and send a status message. In one embodiment, the player can preselect the predetermined event about which he or she would like to receive a status message.

Also, as discussed above, the messages may comprise promotional messages. Another example will illustrate the use of promotional messages in a casino. Whenever a patron logs onto a client terminal in a casino, the patron may be prompted to enter his or her "lucky number." Later, the casino will send a message to all client terminals, offering a promotional draw to all patrons currently logged on to a client terminal. If a patron's lucky number matches (or even partially matches) the number drawn, the patron may win a prize.

Figure 6F:
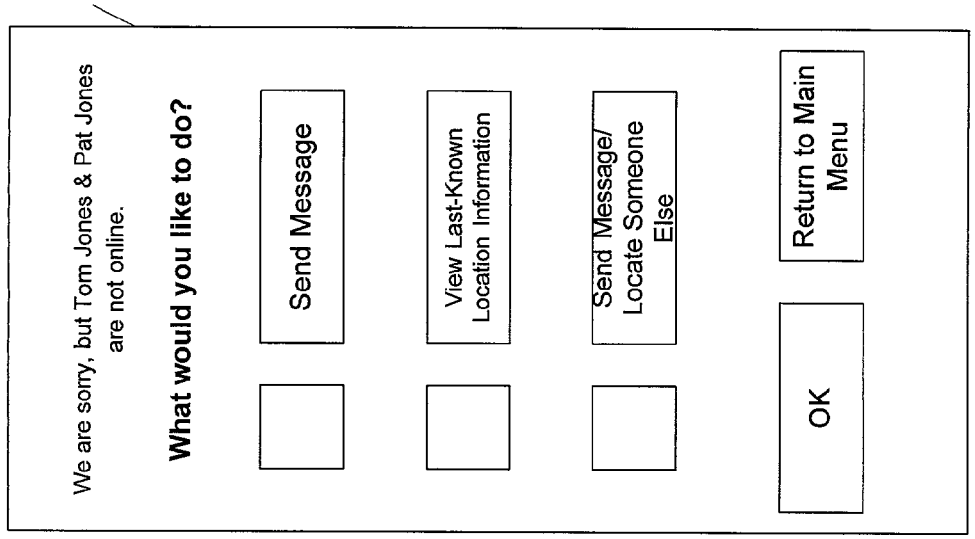
Figure 6E:
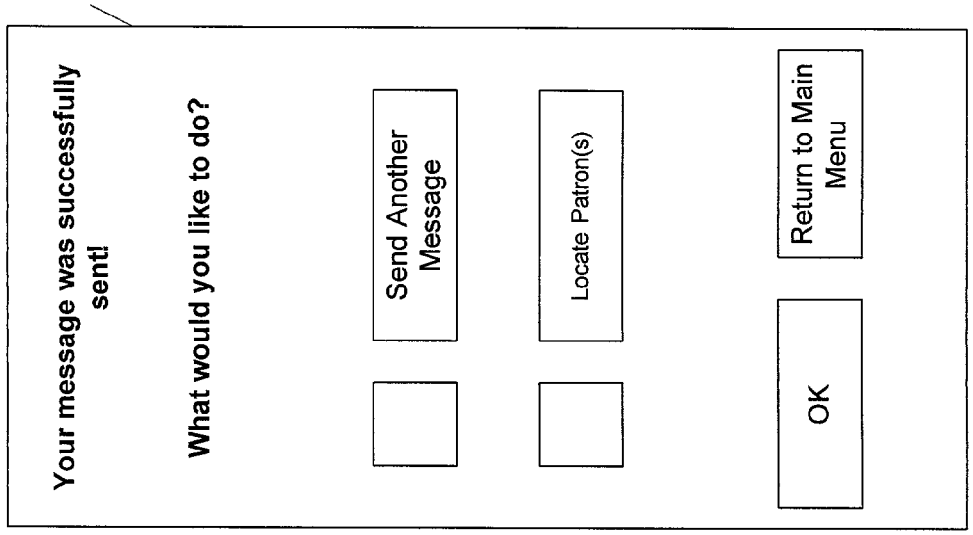

If the server 110 determines that one or more of the selected patrons is not online (step 516), the server may ask whether the user wants to view the last-known location information or whether the user still wants to send a message (step 518), as shown by exemplary message 612 in FIG. 6F. If the user wants to send a message, the user may enter a message, which may be sent to the selected patron by the server 110 at a later time (steps 530 and 531). Again, the message may be a personal, status, promotional, or notification message. Generally, the message is stored in server 110, for example, in the selected patron's patron account file, and may be sent to the selected patron whenever the selected patron logs on a client terminal (step 531). In another embodiment, the user may be given the option of sending a message instructing the selected patron to contact the user whenever the selected patron is located. In this embodiment, the user also may select a time period (e.g., 8 hours) for delivery of the message, for example, as shown by options 614 in FIG. 6G. If server 110 is not able to locate the selected patron in the selected time period, server 110 will not deliver the message to the selected patron.

Moreover, although not shown, in one embodiment, an acknowledgment message may be displayed to the user indicating, for example, that the message was sent. An exemplary acknowledgment message 616 is shown in FIG. 6H.

Alternatively, if the user selects the option of displaying location corresponding to last-known location information (step 518), the server 110 may retrieve the last-known location information from the database 306 (step 528) and display it to the user (step 540) via the client terminal. This information may be displayed in any of the above-described formats (e.g., textual or graphical).

Figure 6J:
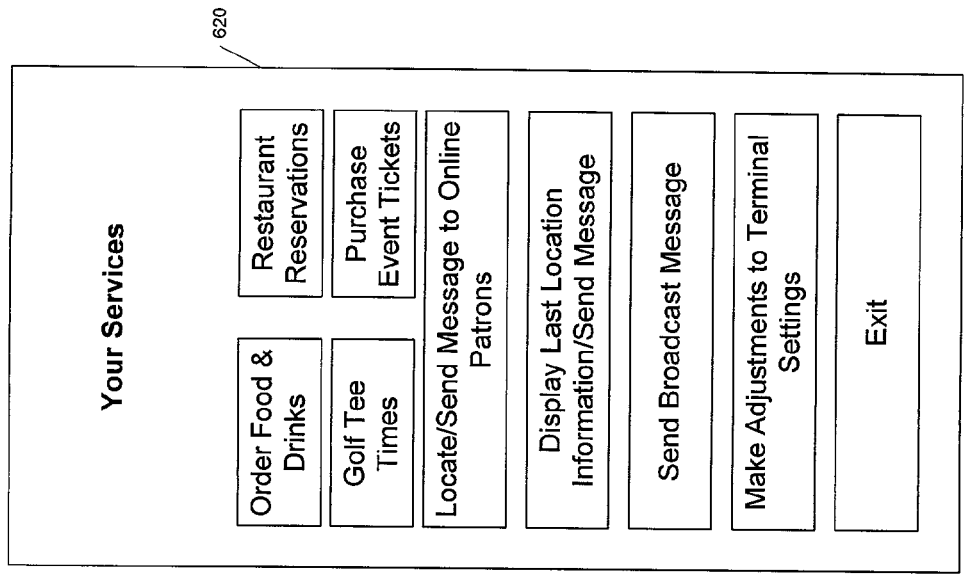
Figure 6I:
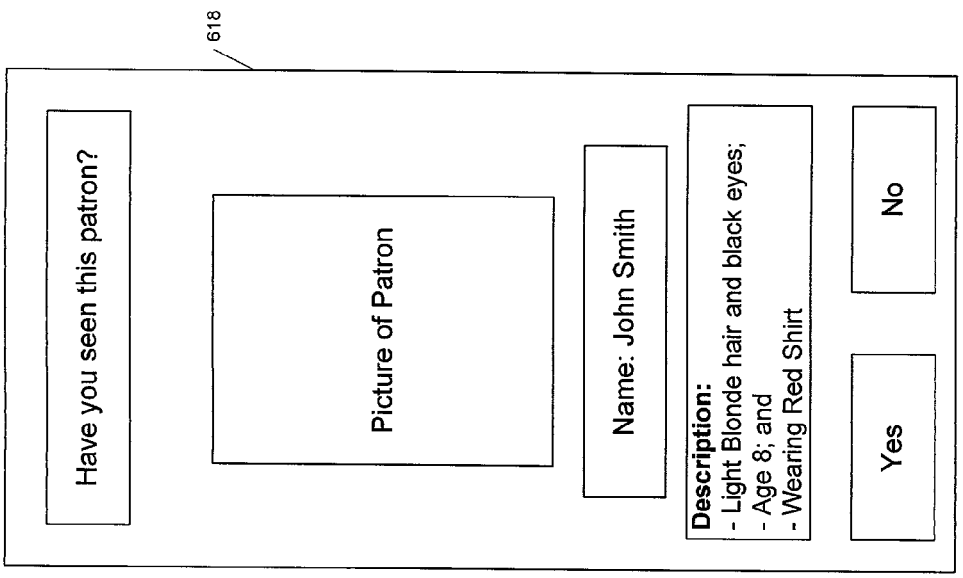

The server 110 may then ask the user, via the client terminal, whether the user wants to send a message to other patrons who may be using client terminals near the last-known location of the selected patrons (step 542). The message that is sent in this step is generally a missing patron message similar to message 618 that is shown in FIG. 6I. The missing patron message may be a message that includes information about the selected patron that may assist in locating that patron. For example, the missing patron message may include the missing patron's photograph, name, and/or description, which may be retrieved from the database 306. In one embodiment, only a person affiliated with the hospitality facility may send a message to patron located near the selected patron's last-known location.

Figure 5:
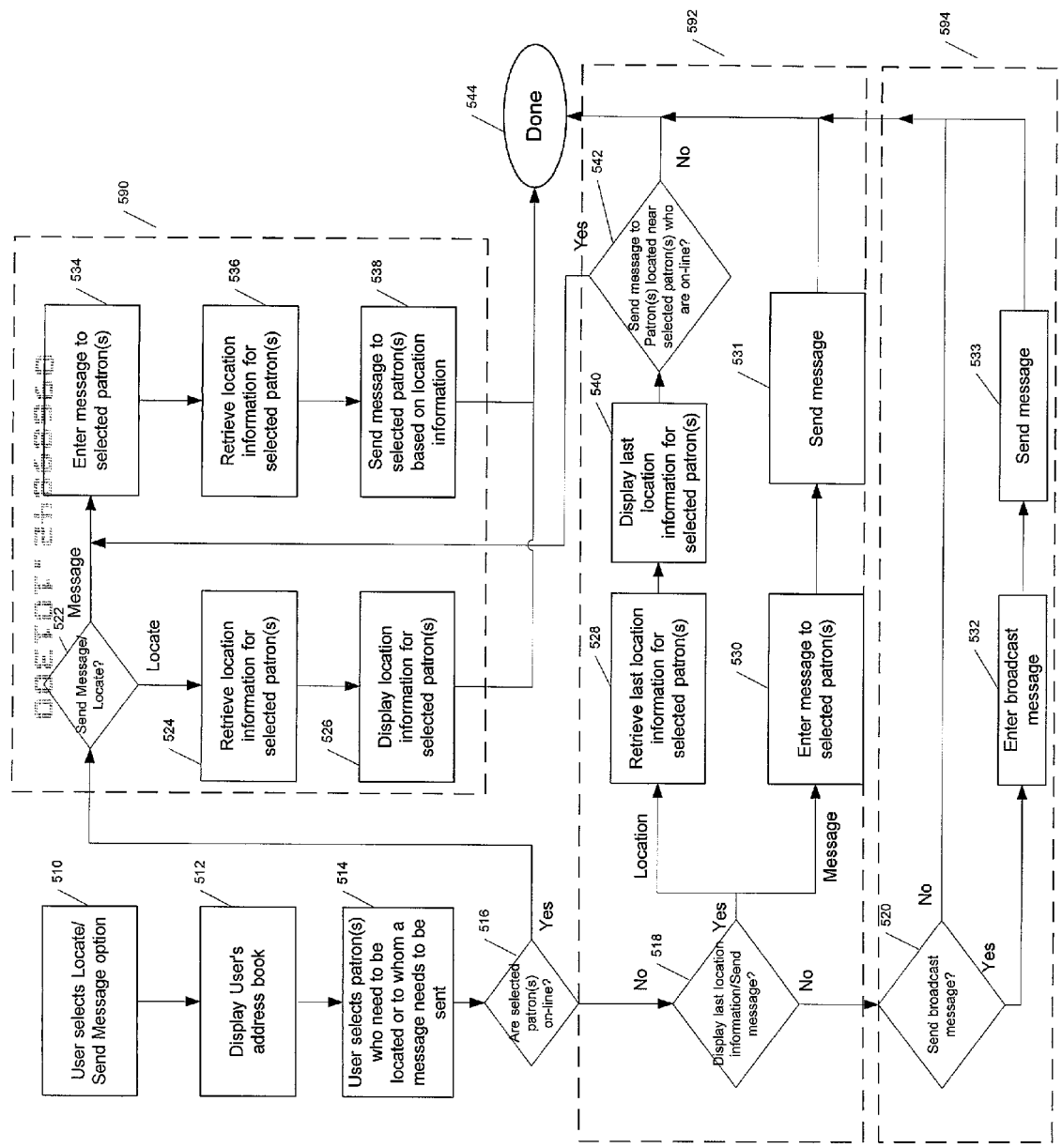

Although not shown in FIG. 5, if the user does want to send a message to patrons located near the last-known location of the selected patron, the server may send the names of patrons that are currently near the last-known location of the selected patron to the client terminal so that it can display the names to the user. The user also may be given the option of selecting some or all of the displayed patrons. Next, the user may enter the message and send the message to the desired patrons (steps 534, 536, and, 538).

In another embodiment, if the user chooses not to display last-known location information or does not want to send a message to the selected patron (step 518), the user may be given the option to send a broadcast message (step 520). A broadcast message is a message that is generally sent to all the patron client terminals 104a-104n, all service client terminals 108a-108n, and all broadcast client terminals 106a-106n in the hospitality facility. In other words, the server 110 ignores the selection made by the user (step 514) and instead sends the broadcast message to all client terminals. In another embodiment, however, the broadcast message may be sent to a subset of selected client terminals. For example, the server 110 may send the message to the client terminals corresponding to the selected patrons only (step 514). Moreover, in one embodiment, the broadcast message may be sent only by hospitality facility personnel. The broadcast message may be a status, promotional, notification, or a missing patron message.

If the user does not want to send a broadcast message, the process is complete (step 544). If, however, the user does want to send a broadcast message, the user may enter the broadcast message (step 532), the server 110 receives the message, and then, the server 110 sends the message (step 533).

In FIG. 5, the message may be in the form of text, graphics, video, and audio. Moreover, the message may be an instant message or an e-mail message. In addition, the message may be sent using known techniques, such as Common Gateway Interface (CGI) or servlets. The message also may be personally delivered to the patron by the hospitality facility personnel. For example, if the server 110 determines that the location identifier for a particular patron corresponds to a restaurant in the hospitality facility, the server 110 could send the message to a service client terminal 108 that is located in a restaurant. The waiter could then hand-deliver the message to the patron at his/her table. Similarly, personnel at the golf course could hand-deliver a message to a patron on the golf course after the patron finishes his/her last hole.

Furthermore, it will be apparent to one skilled in the art that the although the message in FIG. 5 is being sent from a user to selected patron, the selected patron also may send a reply message to the user. Moreover, the selected patron also may receive a message alert notifying the selected patron that a message has been received from a user. The message alert may be an audible alert and/or a dialog box with a message, such as "You have received a message from John Smith."

In addition, the process in FIG. 5 may be broken down into several different processes, for example, as shown by the dotted rectangles 590, 592, and 594 in FIG. 5. The dotted rectangles shown in FIG. 5 may represent three processes: locate and/or send a message to online patrons (590); display last location information and/or send message (592); or send broadcast message (594). These three processes may appear as three options in a menu 620, as shown in FIG. 6J. Moreover, it will be apparent to one skilled in the art that a hospitality facility may choose to only use and implement one of these processes. For example, a hospitality facility, such as a casino, may not want to implement the process of sending a message to patron located near the selected patron's last-known location (steps 542, 536, and 538) whereas a hospitality facility, such as a resort, may want to implement such a process.

The above-noted features, other aspects, and principles of the present invention may be implemented in various system or network configurations to provide automated and computational tools to locate and/or communicate with a patron. Such configurations and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

Furthermore, while the foregoing description related to patrons and hospitality facilities, the present invention is not limited to a patrons and hospitality facilities. For example, the present invention may be used in a similar manner to locate employees of the hospitality facility or employees in an organization.

It will be apparent to those skilled in the art that various modifications and variations can be made in the system and method of the present invention and in construction of this invention without departing from the scope or spirit of the invention. For example, biometric authentication may also be used with the systems, methods, and articles of manufacture consistent with the present invention. If biometric authentication is used, a patron's physical characteristics, such as fingerprint patterns, voice, eyes, face, and hand, etc., may be used as sending device 102 and a biometric device may, such as a fingerprint scanner, may be used as the receiving device 206.

Wireless devices also may be used as sending devices and/or client terminals. For example, a pager could be used as a sending device and a client terminal to receive messages from users. Similarly, cellular phones could be used both, as sending devices, and client terminals to send and receive messages.

In addition, instead of using sending and receiving devices, software authentication methods may be used. For example, the patron may be asked to enter his or her patron identifier number and a PIN to authenticate to server 110.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for locating a patron at a hospitality facility including a server and a plurality of client terminals, the method comprising:
   receiving, from one of the plurality of client terminals, a patron identifier identifying a particular patron and a location identifier identifying a location in the hospitality facility;
   storing, by the server, the location identifier in an account corresponding to the particular patron identified by the patron identifier;
   receiving, from another of the plurality of client terminals, a request for the location of the particular patron;
   retrieving, by the server, from the account corresponding to the particular patron, the location identifier for the particular patron; and
   sending a message based on the location identifier for the particular patron.

2. The method of claim 1, wherein sending a message includes sending, to the client terminal, directions to a location corresponding to the location identifier for the particular patron.

3. The method of claim 1, wherein sending a message includes sending, to the client terminal, a map with directions to a location corresponding to the location identifier for the particular patron.

4. The method of claim 3, wherein sending a map includes deriving the map from a location identifier corresponding to the client terminal and the location identifier for the particular patron.

5. The method of claim 1, wherein sending a message comprises sending the message to the particular patron.

6. The method of claim 1, wherein sending a message comprises sending, to the particular patron, a message for a rendezvous.

7. The method of claim 1, wherein sending a message comprises sending, to the particular patron, a status message indicating the status of an offline game.

8. The method of claim 1, wherein sending a message comprising sending, to the particular patron, a promotional message.

9. The method of claim 1, further comprising:
   receiving from a client terminal a request for an address book; and
   sending the address book to the client terminal.

10. The method of claim 9, wherein receiving a request for the location of a particular patron comprises receiving a selection of the particular patron from the address book.

11. The method of claim 1, wherein sending a message comprises sending an e-mail message.

12. The method of claim 1, wherein sending a message comprises sending an instant message.

13. The method of claim 1, wherein sending a message comprises sending a broadcast message to the plurality of client terminals.

14. The method of claim 13, wherein sending a broadcast message includes sending a missing patron message to the plurality of client terminals.

15. The method of claim 13, wherein sending a broadcast message comprises sending a promotional message to the plurality of client terminals.

16. The method of claim 13, wherein sending a broadcast message comprises sending a notification message to the plurality of client terminals.

17. A method of identifying the location of patrons at a hospitality facility including a server and a plurality of client terminals, comprising:
   requesting, by a client terminal, a list of patrons at the hospitality facility;
   receiving, from the server, the list of patrons;
   displaying the list of patrons;
   receiving, from the client terminal, a selection indicating at least one patron from the list of patrons;
   requesting, from the server, location information for the at least one patron, wherein the location information is stored, by the server, in an account associated with the at least one patron; and
   receiving, from the server, location information for the at least one patron.

18. The method of claim 17, wherein receiving location information for the at least one patron includes receiving textual directions to the location of the at least one patron.

19. The method of claim 17, wherein receiving location information for the at least one patron includes receiving a map with directions to the location of the at least one patron.

20. The method of claim 17, wherein receiving location information for the at least one patron includes receiving the last known location of the at least one patron.

21. The method of claim 17, wherein receiving a selection from a client terminal comprises receiving a selection from a patron at the hospitality facility.

22. The method of claim 17, wherein receiving a selection from a client terminal comprises receiving a selection from a person affiliated with a hospitality facility.

23. A computer-readable medium containing instructions for causing a computer to perform operations for locating a patron at a hospitality facility including a server and a plurality of client terminals, instructions comprising:
   instructions for receiving, from a client terminal, a request for the location of a particular patron;

instructions for retrieving, by the server, from an account corresponding to the particular patron, the location identifier for the particular patron; and instructions for sending a message based on the location identifier for the particular patron.

24. The computer-readable medium of 23, wherein the instructions for sending a message include instructions for sending, to the client terminal, directions to a location corresponding to the location identifier for the particular patron.

25. The computer-readable medium of claim 23, wherein the instructions for sending a message include instructions for sending, to the client terminal, a map with directions to a location corresponding to the location identifier for the particular patron.

26. The computer-readable medium of claim 25, wherein the instructions for sending a map include instructions for deriving the map from a location identifier corresponding to the client terminal and the location identifier for the particular patron.

27. The computer-readable medium of claim 23, wherein the instructions for sending a message comprises sending, to the particular patron, a message.

28. The computer-readable medium of claim 23, further comprising:

receiving from a client terminal a request for an address book; and sending the address book to the client terminal.

29. The computer-readable medium of claim 28, wherein the instructions for receiving a request for the location of a particular patron comprise instructions for receiving a selection of the particular patron from the address book.

30. The computer-readable medium of claim 23, wherein the instructions for sending a message comprise instructions for sending an e-mail message.

31. The computer-readable medium of claim 23, wherein the instructions for sending a message comprise instructions for sending an instant message.

32. The computer-readable medium of claim 23, wherein the instructions for sending a message comprise instructions for sending a broadcast message to the plurality of client terminals.

33. A computer-readable medium containing instructions for causing a computer to perform a method of identifying the location of patrons at a hospitality facility including a server and a plurality of client terminals, the instructions comprising:

instructions for requesting, by a client terminal, a list of patrons at the hospitality facility;

instructions for receiving, from the server, the list of patrons;

instructions for displaying the list of patrons;

instructions for receiving, from the client terminal, a selection indicating at least one patron from the list of patrons;

instructions for requesting, from the server, location information for the at least one patron, wherein the location information is stored, by the server, in an account associated with the at least one patron; and instructions for receiving, from the server, location information for the at least one patron.

34. The computer-readable medium of claim 33, wherein the instructions for receiving location information for the at least one patron include instructions for receiving textual directions to the location of the at least one patron.

35. The computer-readable medium of claim 33, wherein the instructions for receiving location information for the at least one patron include instructions for receiving a map with directions to the location of the at least one patron.

36. The computer-readable medium of claim 33, wherein the instructions for receiving, location information for the at least one patron include instructions for receiving the last known location of the at least one patron.

37. A system for locating and communicating with a patron at a hospitality facility comprising:

a plurality of client terminals, each client terminal including
  an input device for receiving a request for the location of a particular patron, and
  a first network interface for sending the request; and a server, connected to each of the plurality of client terminals, and including
  a second network interface for receiving the request,
  a controller for processing the request, and
  a database server for retrieving, from an account corresponding to the particular patron, a location identifier for the particular patron;
  wherein the second network interface sends a message based on the location identifier for the particular patron.

38. The system of claim 37, wherein the plurality of client terminals further comprise a receiving device for receiving a patron identifier identifying a patron and a location identifier identifying a location in the hospitality facility and wherein the first network interface sends the patron identifier and the location identifier to the server.

39. The system of claim 38, wherein the second network interface receives the patron identifier and the location identifier, and the database server stores the location identifier in an account corresponding to the patron identified by the patron identifier.

40. The system of claim 37, wherein the message includes directions to a location corresponding to the location identifier for the particular patron.

41. The system of claim 37, wherein the message includes a map with directions to a location corresponding to the location identifier for the particular patron.

42. The system of claim 41, wherein the map is derived from a location identifier of the one of the plurality of client terminals and the location identifier of the particular patron, and an internal mapping of the hospitality facility.

43. The system of claim 37, wherein the message is a request to send a message to a particular patron at the hospitality facility.

44. The system of claim 37, wherein the message is a broadcast message to the plurality of client terminals.

* * * * *